United States Patent Office 3,169,103
Patented Feb. 9, 1965

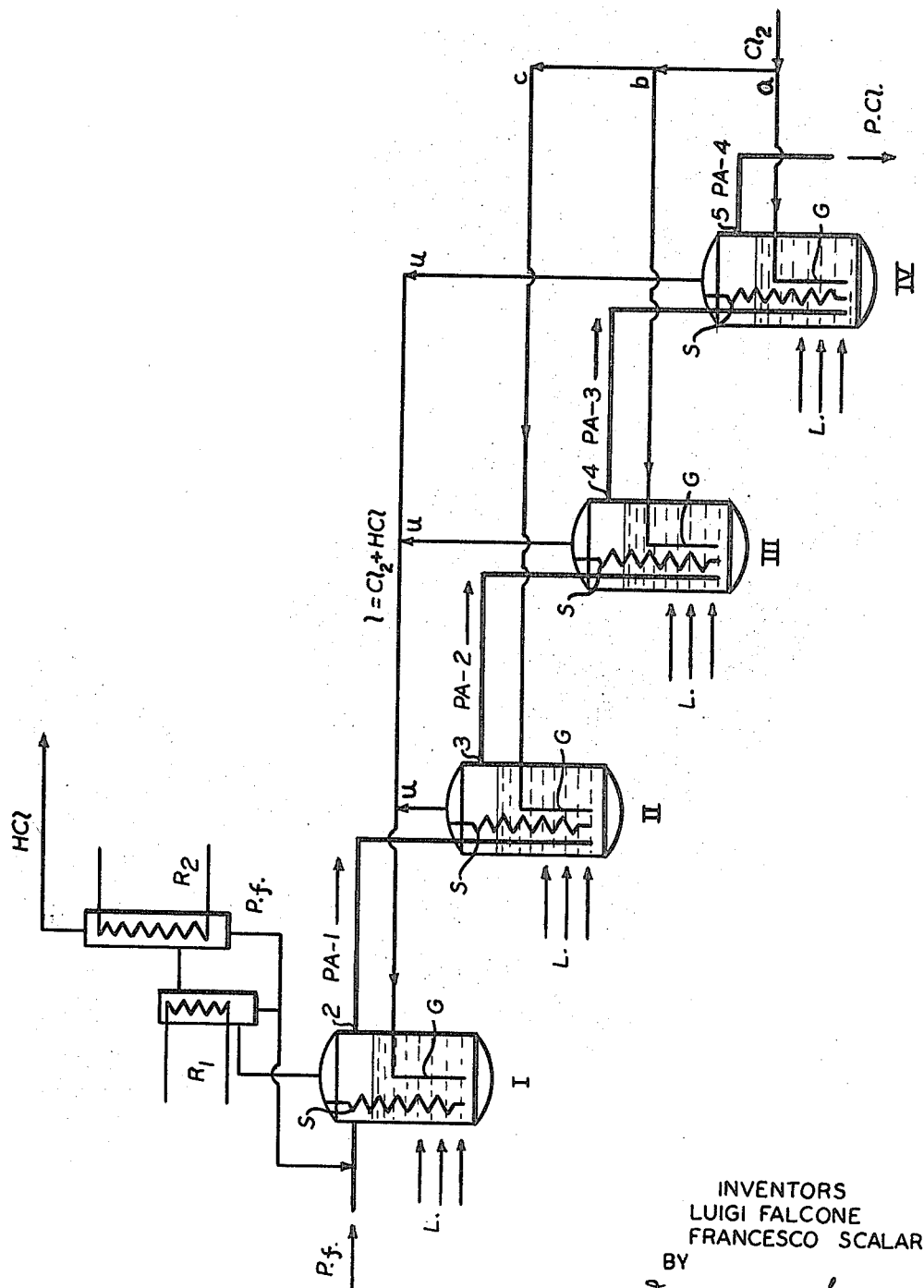

3,169,103
PROCESS FOR HALOGENATING ORGANIC COMPOUNDS
Luigi Falcone and Francesco Scalari, Ferrara, Italy, assignors to Montecatini, Società Generale per l'Industria Mineraria e Chimica, Milan, Italy, a corporation of Italy
Filed Oct. 24, 1961, Ser. No. 147,280
Claims priority, application Italy Oct. 27, 1960
7 Claims. (Cl. 204—158)

The present invention relates to a process for halogenating organic products which are extremely unstable under the reaction conditions of their use, and more particularly, to organic peroxides to be used as free radical generators. According to a more specific aspect, our invention relates to the chlorination of organic peroxides to be used as cross-linking agents for vulcanizing mixes containing natural or synthetic polymers or copolymers.

In U.S. Patent No. 2,501,966 there is described the direct chlorination of organic peroxides containing at least one tertiary alkyl radical. The haloperoxides thus obtained exhibit a higher thermal stability and a lower vapour pressure than the initial organic peroxide. Moreover, they exert their activity as polymerization catalysts at lower temperatures than the temperatures required for the unhalogenated peroxides.

In certain prior-art patents the use of particular organic peroxides as cross-linking agents for olefin polymers and copolymers has been described. Particularly useful among these peroxides are those which, due to certain intrinsic properties (e.g., decomposition temperature, vapour pressure, decomposition rate, resistance to heterolytic decomposition), render possible all the technological operations needed for transforming the initial product into a vulcanized end product. It frequently happens that an organic peroxide which cannot be used in its normal state due to, e.g., high vapour pressure or to harmful explosive characteristics, becomes acceptable after introduction of one or more halogen atoms into its molecule.

The direct halogenation of organic peroxides according to U.S. Patent 2,501,966 presents a number of difficulties which do not permit the carrying out of experiments on a larger scale such as would be necessary for production of a commercial character. This is true also with respect to relatively stable peroxides such as organic peroxides having the peroxidic group connected to two tertiary alkyl radicals. For example, if tests are carried out using about 200 g. of tertiary butyl peroxide according to the process of U.S. Patent 2,501,966, one observes that the reaction exhibits the characteristic of an initial induction time followed by a very rapid commencement of the reaction, during which all the chloride previously dissolved reacts instantaneously. In the reaction vessel there is accordingly observed a sudden temperature increase caused by the exothermic reaction. Attempts to eliminate the reaction-inhibiting materials from the starting peroxide have not been successful. Further tests have demonstrated that if the amount of peroxide is increased, the thermal effect following the initial induction period causes ignition and subsequent decomposition of the reaction product. In the case of tertiary butyl peroxide, explosions were avoided only because of the high thermal stability of the peroxide.

Tests carried out with catalysts in the absence of light gave negative results.

Diazoamino-benzene (Porofor), iodine, sulfur chloride and iron powder were tested. In the case of iron powder, when the reaction residue was discharged into a sewer there was observed a sudden ignition of the product, this ignition having been caused by the action of diffused day light. The use of iron chloride ($FeCl_3$) as a catalyst in the presence of light caused, after a few minutes, a sudden temperature increase in the reaction flask and ignition of the peroxide. It is therefore convenient to operate in the presence of only actinic light, avoiding the use of the normal chlorination catalysts. Light sources rich in high-frequency radiation, more particularly, an ultraviolet light source, also causes rapid decomposition of the reaction product.

Chlorination in the presence of solvents did not lead to the aforementioned decomposition phenomena, at least with the amount of peroxide used. It has however been noted that the use of a solvent involves the following inconveniences:

(1) There is a considerable decrease in reaction rate.
(2) The conversion of chlorine is not total, which requires that the chlorine be recovered after separation of hydrochloric acid.
(3) Due to the high reactivity of chlorine, completely chlorinated solvents must be used. The most suitable, namely, carbon tetrachloride, reacts under the reaction conditions, thus introducing the radical-$CCl_3$ into the peroxide.
(4) Separation of the solvent involves a further operation of distillation. However, it has been observed that the chlorosubstituted products of various peroxides, e.g., of tertiary butyl peroxide, become unstable after distillation, even under vacuum.

Successively a constant liberation of hydrochloric acid is observed. Very careful washing treatments with soda solutions and filtrations through active coal were not effective in eliminating such acid.

An object of the present invention is to provide a process for halogenating organic products, which products are highly unstable under the reaction conditions of their use, and particularly to peroxides, which process does not exhibit the aforementioned inconveniences and which permits continuous operation with the obtaining of very high commercial yields.

Additional objects will become apparent hereinafter.

According to one aspect of our invention, halogenation of the fresh peroxide is carried out under the action of luminous radiation and in the presence of a quantity of previously partially halogenated compound, which compound acts as a diluent for the unhalogenated fresh compound.

According to a further aspect of the invention, the formation of the partially halogenated compound which acts as diluent for the subsequent fresh compound is carried out using a mixture of a halogen and a halogenhydric acid.

Initial tests showed that rate constants of successive chlorination reactions varied as a function of the amount of chlorine introduced. (For instance, by introducing in tertiary butyl peroxide an amount of halogen corresponding to the monohalogenated derivative, one obtains the conversion of 70% of peroxide into a product made up of about 85% of monohalide and about 15% of dihalide, together with very small amounts of trihalide.) In no case was it possible to introduce into the peroxide halogen in an amount greater than 65% by weight even when the reaction was continued for a number of days.

The halogen conversion, which is almost total at the beginning of the reaction, gradually decreases to zero.

In practice it has been found that the reaction rate becomes negligible when the peroxide contains about 50% of halogen by weight. This fact, which was not known heretofore, led us to the use of a peroxide halogenated up to 50% as the reaction solvent, and this is one feature of the invention.

The product, halogenated up to 50% and the fresh (unhalogenated) product were mixed in equal proportion (by weight) and halogen (chlorine) was introduced to obtain an average chlorine content, based on the total mixture, of about 50% by weight. The product obtained is suitable for use as a vulcanizing agent. Although such a process is not dangerous, it is not satisfactory from an industrial point of view since it requires discontinuous operation in a reactor volume which is very high as compared to the product obtained.

We have surprisingly found, and this is a second feature of our invention, that by diluting the halogen with gaseous halogenhydric acid it is possible to carry out, without inconvenience, the halogenation of a peroxide, e.g., tertiary butyl peroxide, having a purity degree of 100%.

This fact allowed the realization of a process for carrying out continuously the halogenation of any peroxide, particularly of tert.butyl peroxide, tert.butylhydroperoxide, tert.butylperbenzoate, methylethylketone peroxide, etc. etc., as will be described by way of illustration, with reference to accompanying FIGURE 1.

In FIGURE 1, I, II, III and IV indicate four halogenation reactors connected in cascade, $P_f$ representing fresh unhalogenated peroxide entering the first reactor I, $PA_1$ representing partially halogenated peroxide which passes from the first to the second reactor, and L representing a light source associated with each reactor.

At the right side of the figure is shown a halogen source, $Cl_2$, feeding in parallel the reactors II, III and IV through lines $a$, $b$, and $c$ and scrubbers G coupled with each reactor. Reactors II, III and IV are provided with an outlet U, through which excess halogen is recovered from the respective reactors, together with the halogenhydric acid formed in the same reactors II, III and IV. Reactor I, on the contrary, is not fed with pure halogen but with the halogen-halogenhydric acid mixture recovered from reactors II, III and IV (line $1=Cl_2+HCl$). In this way we obtained in reactor I the first partial halogenation of fresh peroxide $P_f$. The product of this first halogenation (partially halogenated peroxide) $PA_1$ passes through overflow 2 into reactor II where it is further halogenated with pure halogen without any difficulty, since the halogenation is carried out on an already partially halogenated peroxide or (which is equivalent) on an unhalogenated peroxide diluted with a partially halogenated peroxide. The product of this second halogenation, $PA_2$, passes successively from reactor II to reactor III through overflow 3. The same reaction occurs with peroxide $PA_3$, which is further halogenated in reactor III and passes into reactor IV through overflow 4.

From reactor IV it is possible to withdraw (through overflow 5) a halogenation product, $PA_4$, having the desired degree of halogenation. Each reactor is provided not only with its own light source L, but also with a cooling coil S. Moreover, from reactor I the exhaust gases can be recovered and condensed in two coolers $R_1$ and $R_2$, from which peroxide $P_f$, entrained by gases (which peroxide is introduced again into reactor I), is discharged, and the halogenhydric acid contained therein is stripped therefrom.

Some practical results are illustrated hereinafter. The following example relates to chlorination. The same results, however, are obtained using other halogens, namely, bromine, fluorine, and/or iodine.

*Example*

The reaction is carried out in an apparatus consisting of 4 glass reactors connected in cascade as shown in the figure. The charge is determined for a production of about 0.5 kg./hour of tetrachloroderivative of tertiary butyl peroxide and is as follows:

|  | G./hour |
|---|---|
| Tertiary butyl peroxide | 240 |
| Chlorine | 420 |

For these amounts of reactants, 4 glass flasks are provided, each with a capacity of about 0.5 litre, with a total useful volume of 1.6 litres, and the duration of the passage of the liquid is fixed at about 5 hours. The flasks are provided with an inlet and outlet for the liquid and with an inlet and outlet for the gases. Agitation is caused by the entering chlorine and by the developed hydrochloric acid. Fresh peroxide, $P_f$, to be chlorinated is sent to the first flask while chlorine, $Cl_2$, is sent directly only to the last three flasks II, III and IV. The discharged products U, consisting of residual chlorine diluted with hydrochloric acid formed therein, are mixed together and sent to the first flasks I. Recycle of chlorine is not necessary since the chlorine is initially introduced in the required amount. The chlorinated product, before being discharged, is sent to a washing column (not shown in the drawing) filled with a 15% $Na_2CO_3$ solution, in order to eliminate hydrochloric acid dissolved in the product.

In order to obtain a regular passage of the liquid through the reactors the height of the heads (not shown in the figure) must be properly adjusted.

Moreover, the flasks are provided with coolers S which are applied to the discharge of the gases, and with cooling baths containing water at room temperature. The bottom of the cooling baths consists of a transparent material through which luminous radiation L is supplied by 5,000-lumen lamps.

In the various reaction flasks a temperature of 40° C. is reached. The quantitative data relating to a 7-hour run is reported hereinafter. Among the discharged products are reported the "head-product" that corresponds to the liquid entrained by hydrochloric acid outside flask I and condensed by cooling the gas through two separators $R_1$ and $R_2$.

The "head-product" is expressed as monochloride but it actually consists of a mixture having the following composition:

| | Percent |
|---|---|
| Tertiary butyl peroxide | 40 |
| Monochloro-derivative | 37 |
| Dichloro-derivative | 23 |

7-hour run:
  Introduction—
    Peroxide 2.10 litres; 1.68 kg.; 11.5 mols
    Chlorine (gas) 1020 litres (20° C.); 3.0 kg.; 42.3 mols
  Discharge—
    "Head product" expressed as monochloride: 0.232 litre; 0.221 kg.; 1.2 mols
    Tetrachloro-derivative: 2.16 litres; 2.8 kg.; 9.86 mols
    Hydrochloric acid: 1000 litres (20° C.); 1.49 kg.; 41.0 mols

| | Peroxide | Chlorine | Monochloro derivative | Tetrachloro derivative | HCl |
|---|---|---|---|---|---|
| Moles introduced | 11.5 | 42.3 | | | |
| Moles extracted | | 1.3 | 1.2 | 9.86 | 41 |
| Raw materials consumed, moles | 11.5 | 41.0 | | | |
| Useful products, moles | | | 1.2 | 9.86 | 41 |

The yield calculated on peroxide is 96%. The conversion of chlorine is 97%.

The apparatus gives in 1 hour 1.41 moles (400 g.) of the tetrachloro derivative of tertiary butyl peroxide, corresponding to 250 g./hour litre.

Similar results are obtained by halogenating with bromine, iodine or fluorine instead of chlorine.

Variations can, of course, be made without departing from the spirit of our invention.

Having thus described our invention, what we desire to secure and hereby claim in Letters Patent is:

1. A method for halogenating an organic peroxide to be used as a free radical generator, said method comprising treating fresh organic peroxide in a first reaction zone with a mixture of halogen and a hydrohalogenic acid to thereby form a reaction product comprising partially halogenated organic peroxide, and passing said reaction product to a second reaction zone and treating said reaction product with a halogen to thereby effect further halogenation thereof and to form a hydrohalogenic acid, each of said halogenations being carried out in the presence of luminous radiation.

2. The method of claim 1 wherein the peroxide is tertiary butyl peroxide, the halogen is chlorine, and the hydrohalogenic acid is hydrochloric acid.

3. The method of claim 2, wherein the diluent comprises a mixture of mono-, di-, tri- and tetrachloro-tertiary butyl peroxides.

4. A method for halogenating an organic peroxide to be used as a free radical generator, said method comprising treating fresh organic peroxide in a first reaction zone with a mixture of halogen and a hydrohalogenic acid to thereby form a reaction product comprising partially halogenated organic peroxide, passing said reaction product to a second reaction zone and treating said reaction product with a halogen to thereby effect further halogenation thereof and to form a hydrohalogenic acid, each of said halogenations being carried out in the presence of luminous radiation, at least a portion of the mixture of the hydrohalogenic acid and halogen in said first reaction zone being supplied by recovering from said second zone excess halogen and hydrohalogenic acid formed in said second zone.

5. The method of claim 4, wherein said reaction product also contains non-halogenated organic peroxide and wherein said partially halogenated organic peroxide serves as a diluent therefor.

6. The method of claim 5 carried out continuously and wherein said first and second zones are connected in cascade.

7. The method of claim 4 wherein more than two reaction zones are successively employed wherein the halogenating reagent introduced into each of said zones subsequent to said first zone consists of concentrated halogen, and wherein at least a portion of the mixture of hydrohalogenic acid and halogen in said first zone is obtained by recovering from those zones subsequent to the first zone excess halogen and hydrohalogenic acid formed in such subsequent zones.

References Cited in the file of this patent

UNITED STATES PATENTS

| | | |
|---|---|---|
| 2,065,400 | Salzberg et al. | Dec. 22, 1936 |
| 2,443,183 | Cass | June 15, 1948 |
| 2,501,966 | Rust et al. | Mar. 28, 1950 |